Dec. 26, 1933.  A. D. MIZZY ET AL  1,940,724
PARKING DEVICE
Filed June 11, 1929   4 Sheets-Sheet 1
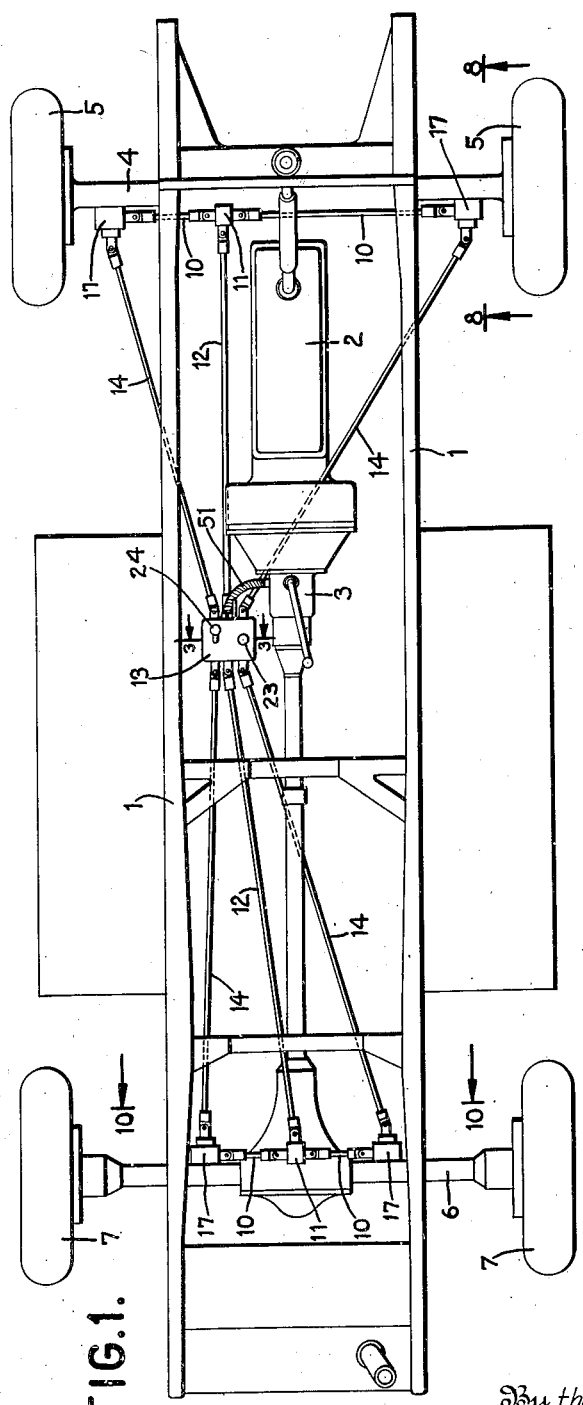
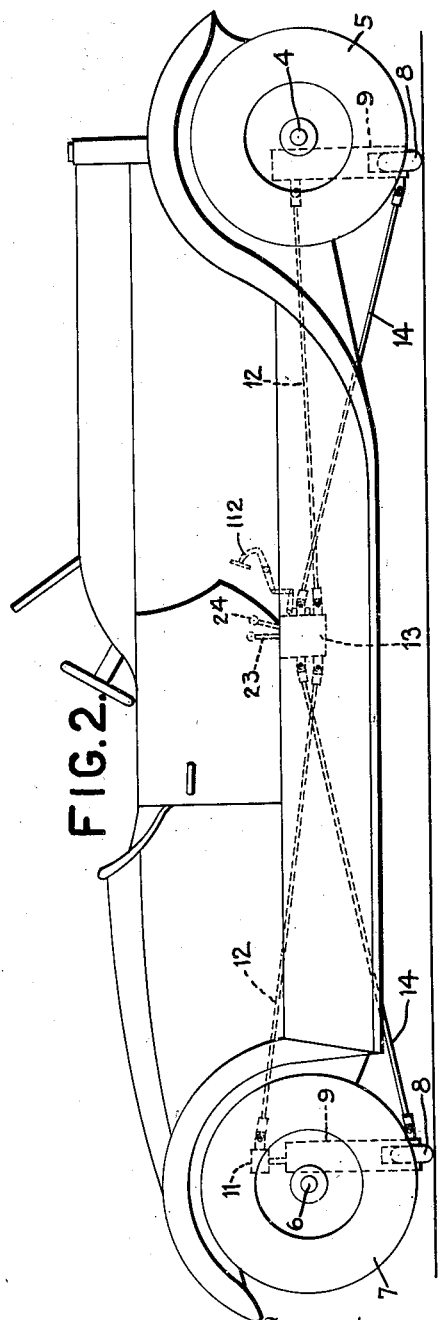
Inventors
ALBERT D. MIZZY
WILLIAM FAVINI
By their Attorneys
Bohleber & Ledbetter

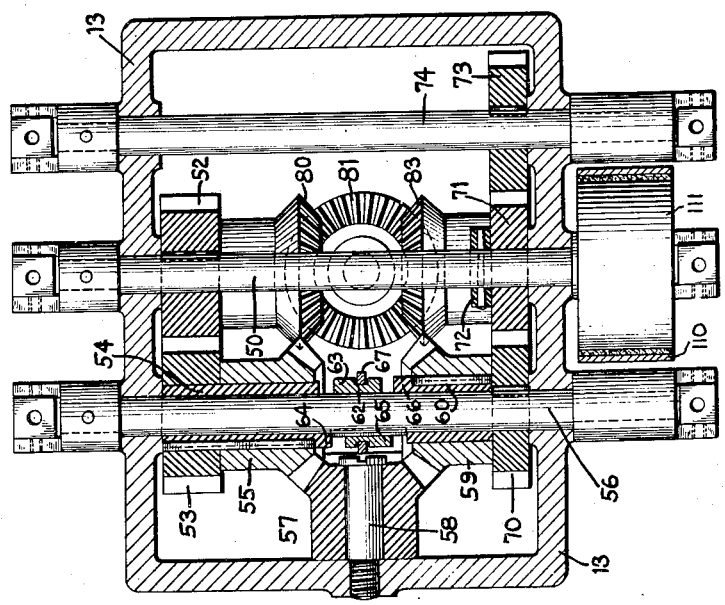
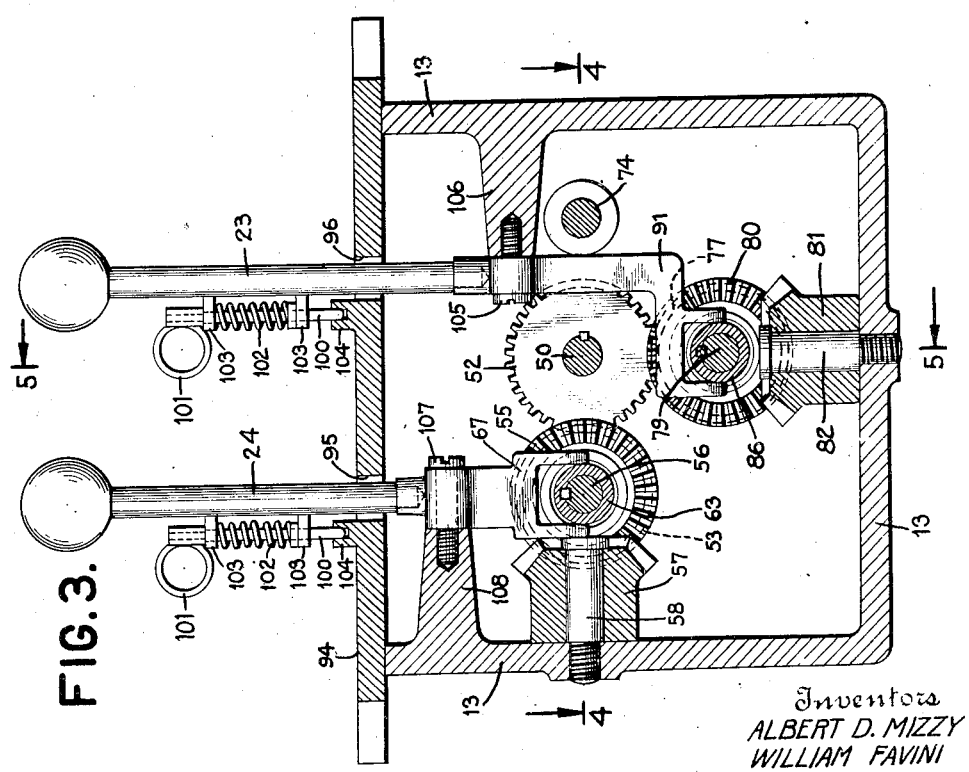

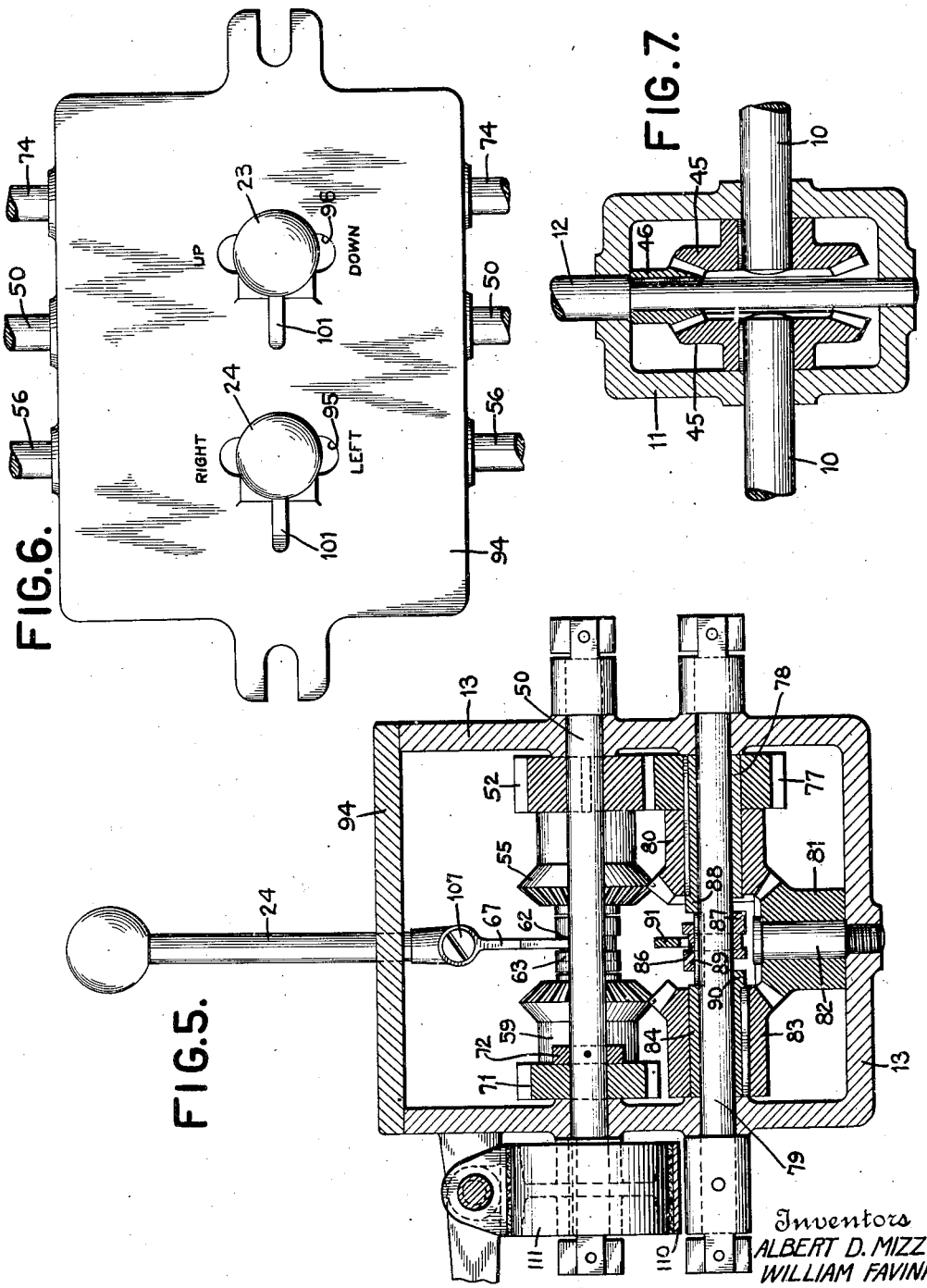

Dec. 26, 1933.     A. D. MIZZY ET AL     1,940,724
PARKING DEVICE
Filed June 11, 1929     4 Sheets-Sheet 4
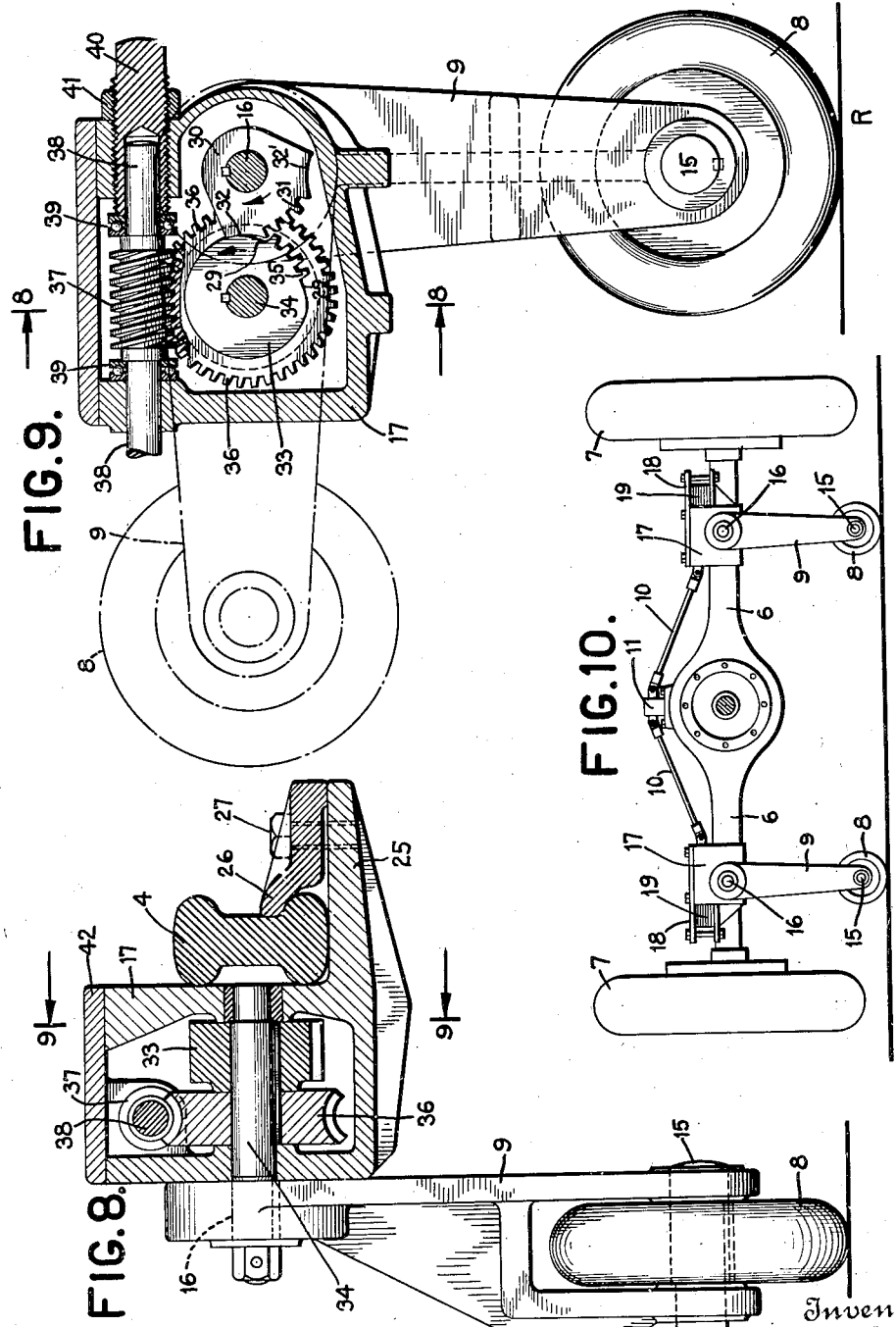
Inventors
ALBERT D. MIZZY
WILLIAM FAVINI
By their Attorney
Bohleber & Ledbetter Patented Dec. 26, 1933

1,940,724

UNITED STATES PATENT OFFICE 1,940,724

PARKING DEVICE

Albert D. Mizzy, New York, and William Favini, South Ozone Park, N. Y.

Application June 11, 1929. Serial No. 370,093

9 Claims. (Cl. 180—1)

This invention relates to a parking device by which a motor vehicle may be propelled sidewise or at right angles to its normal direction of motion and this sidewise propulsion is performed by power taken either directly or indirectly from the motor of the vehicle. The device consists generally of retractile parking wheels which raise the motor vehicle so that the wheels of the vehicle are not in contact with the ground and enabling the retractile wheels to roll the vehicle sidewise. The axis of the retractile wheels are therefore normal to the axis of the motor vehicle wheels.

An object of the invention is to provide a parking device for motor vehicle which is controlled entirely from the driving seat both to raise the vehicle from its wheels and to propel the car sidewise in order to park it.

Another object of the invention is to drive the entire parking device from the power plant of the motor vehicle.

A further object of this invention is to produce a parking device which can be mounted upon the axle, spring, or axle structure of the motor vehicle.

Another object is to have the transmission for raising the vehicle and the transmission for sidewise propulsion to be located in a single central transmission box.

Other objects of the invention will be apparent from its description in the following specification and the drawings in which:

Figure 1 is a plan view of the motor chassis carrying the parking device showing the driving connections from a central transmission box.

Figure 2 is a side view of the motor vehicle equipped with the parking device showing the motor vehicle raised from the ground by the retractile parking wheels and the driving connections thereto.

Figure 3 is a section through the transmission box showing the clutches and the driving connections within the box.

Figure 4 is a section on plane 4—4 of Figure 3 and shows additional transmission mechanism.

Figure 5 is a section of the transmission box on plane 5—5 of Figure 3 and shows additional transmission mechanism.

Figure 6 shows the cover plate for the transmission box with control instructions.

Figure 7 is a section showing the details of the retracting means within the driving box.

Figure 8 is a section through the retracting driving mechanism and the bracket construction securing the retractile wheel to the axle of the motor vehicle.

Figure 9 is a section on the plane 9—9 of Figure 8 showing the retracting mechanism for the retractile wheel.

Figure 10 shows the retractile wheels mounted upon the springs for the rear axle and the driving connections to the retractile wheels.

The construction of our invention enables the retractile wheels to be mounted upon the axle or upon the springs supporting the motor vehicle body on the axle, therefore, when the motor vehicle is raised from its wheels by the retractile parking wheels, the entire vehicle including the vehicle wheels is raised. Many parking devices are attached to the frame of the motor body and then when the parking wheels raise the motor vehicle from the ground and the weight of the vehicle wheels flex the springs and lowers them relatively to the motor body. The parking devices which are attached to the body frame must necessarily require the retractile parking wheels to raise the motor vehicle an increased height to compensate for the lowering of the wheels in order that the motor wheels be raised from contact with the ground. It is for this reason that the retractile parking wheels of this invention are mounted upon the wheel axles of the motor vehicle or to the springs suspending the wheels to the chassis at a point adjacent to the bracket by which the spring is attached to the axle. Attachment of the parking device to the spring is equivalent to an attachment of the device directly to the axle of the vehicle. This spring and axle are the vehicle wheel supporting mechanism.

The features of the motor vehicle which may be taken as general for all vehicles to which our device is attached are the motor vehicle frame 1, Figure 1, with the motor 2 supported thereon and the motor transmission box 3. The front axle 4 and the rear axle 6 with the rear driving wheels 7 are at the rear end of the frame. Other features are not pertinent to this disclosure and will not be referred to.

The retractile parking wheels 8 (Figure 10) are mounted upon the retracting arms 9 and the arms are pivoted to the casing 17 which casing is secured to the axle or the axle spring adjacent thereto or to both axle and spring. Driving rods 10 (Figure 1) transmit power from the driving box 11 to the retracting arms in order to swing them from underneath the frame to their vertical position. The arms 9 with the wheels 8 are long enough to raise the motor vehicle several inches from off its wheels 5 and 7. The distance through which the vehicle is raised is immaterial and may be increased or decreased merely by selecting the proper length of arm 9. The rods 10 are provided with suitable flexible joints or a flexible shaft may be provided to enable the driving box 11 to be placed out of alignment with the drive into the casing 17 and thereby pass over or around any obstructions which would otherwise prevent a drive connection. The driving rods 10 further are telescoping thereby enabling the parking mechanism to be affixed to any vehicle irrespective of the distance between the supporting springs 19. The driving box 11 is connected by a telescoping driving rod 12 having suitable flexible joints to the transmission box 13. There is a separate telescoping driving rod 14 having flexible joints connecting the transmission box 13 to each of the parking wheels 8.

Control levers 23 and 24 extend into the transmission box, one of which controls the clutch which raises and lowers the vehicle from off the ground and the other operates the clutch which drives the parking wheels 8. These levers project through the floor board of the vehicle and are within easy reach of the driver of the vehicle.

The parking wheel 8 (Figure 10) is mounted upon shaft 15 which is rotatably mounted in the end of the retractile arm 9 which is bifurcated to receive the wheel although any form of wheel support upon the end of the arm is suitable. The arm is secured at its upper end to the shaft 16 which shaft is pivotally mounted in the casing 17. The casing carries a bracket 18 attaching the box to the spring 19. On the front axle, the casing 17 is provided with an arm 25 which carries a clamping bracket 26 and bolt 27 to clamp the casing to the axle 4. The casing 17 for the rear axle may be similarly secured directly to the axle or both axle and spring and similarly the front axle casing 17 may be secured to the spring or to both spring and axle.

The shaft 16 is rotatably mounted in the box 17 and carries a segmental gear 30 which is keyed to the shaft. The segmental gear 30 carries a limited number of teeth 31 but which are sufficient to rotate the retractile arm 9 through an arc sufficient to swing the parking wheels 8 from contact with the ground and upward underneath the car to give ample clearance between the parking wheels and the ground in retracted position. Although Figure 9 shows the arms to be swung through a 90 degree angle this angle may be greater or lesser as desired. If other structures of the motor vehicle prevent a full 90 degree angular movement it may be made less than this amount. On each side of and adjacent to the toothed portion of the segmental gear 30 are the arcs 32 and 32'.

A second segmental gear 33 is mounted and keyed upon the shaft 34 and has a limited number of teeth 35 which mesh with the teeth 31 of the segmental gear 30. The segmental gear 33 carries one tooth 35 for each tooth space of the gear 30 and therefore in the particular gear size shown, four teeth are provided on gear 30 and five on gear 33. The remainder of the gear 33 is cylindrical, the radius of the cylindrical portion being less than the outside radius of the teeth. The gears 30 and 33 are a modified form of Geneva wheel. The cylindrical portion of the gear 33 is undercut at 29, on either side of the teeth 35 so that the points of the arcs 32 and 32' do not join on the cylindrical surface of gear 33 as the gear teeth 31 and 35 unmesh or rotate out of inter-engagement.

A worm wheel 36 is also keyed to the shaft 34 and meshes with the worm 37 mounted upon shaft 38 which shaft is rotatably journaled in the box 17. Thrust bearings 39 carry the thrust from the worm and an adjusting nut 40 is threaded into the casing 17 and carries the end of the shaft 38 to take up wear. A locking nut 41 locks the adjusting nut 40 in adjusted position. A cover plate 42 enables the driving mechanism within the casing to be readily accessible. The shaft 38 is connected to the driving shaft 10 which in turn is connected to the transmission box through the drive box 11 and drive shaft 12 as previously described.

The manner in which the arm 9 carrying the parking wheel 8 is operated will now be described. The shaft 38 (Figure 9) is rotated from the driving rod 10 which rotates the worm 37 and drives the worm wheel 36. The worm wheel and the segmental gear 33 are keyed upon the same shaft 34 so that gear 33 rotates with the worm wheel. The arc 32 of the driven segmental gear 30 is in sliding contact with the cylindrical portion of the gear 33 and so long as the gears 33 and 30 are in this position the arm 9 is locked in vertical position. Rotation of the gear 33, however, in the direction of the arrow (Figure 9) brings the teeth 35 into contact with the teeth 31 of the driven gear 30. The gear 30 is thereupon rotated by the meshing of the teeth 35 with the teeth 31 until the arc 32' comes into contact with the cylindrical portion of the gear 33 on the opposite side of the teeth 35 from that engaged by the arc 32 in the position shown in Figure 9. The segmental gear 30 is keyed to the shaft 16 as is also the parking wheel arm 9 so that this rotation of the gear 30 swings arm 9 from its vertical position in contact with the road R to its retracted position shown in dotted lines.

Since the arc 32' of the driven gear 30 is in contact with the cylindrical portion of the gear 33 the arm is locked in retracted position in the same manner that the arm is locked in its vertical position. It is obvious from the extent of circumference of the cylindrical portion of the driving gear 33 that considerable rotation of the gear 33 is possible before the teeth 35 will complete one revolution and engage the face of the arc 32. The worm and worm wheel drive is furthermore a high reduction drive so that it would take a great number of revolutions of the worm shaft 38 in order to bring about complete rotation of the teeth 35 and bring them into contact with the opposite face of the arc 32. It will be seen therefore that the margin of safety in this driving mechanism is very high. The same margin of safety is secured between the driving gear 33 and the driven gear 30 in the raised or retracted position of the arm 9.

The parking wheel on the arms 9, when being swung from retracted position into its vertical position, contacts with the ground some time before the arm is in vertical position. Continued circular movement of the arm raises the vehicle and wheels from off the ground and the parking wheels now support the car. The parking mechanism therefore serves as a jack to jack the car off of its wheels for tire changing as well as for parking. The raising of the car by the circular or swinging movement of the arm 9 and its wheel 9 requires considerable effort or torque and this is supplied by the worm and worm wheel drive previously described which is connected to the vehicle power plant.

Referring to Figure 7 there is shown a cross section through the gear box 11 which shows the drive shafts 10 which are connected to the respective arm retracting or swinging mechanism. The end of each shaft 10 carries a bevel gear 45 which is in mesh with the pinion 46 on opposite sides thereof. The pinion 46 keyed to the shaft 12 which is also rotatably journaled in the gear box 11 and completes the driving connection between the transmission box 13 and the retracting mechanism.

As previously described the parking wheels are driven through shafts 14 from the transmission box 13, the details of which are shown in Figures 3, 4, and 5. Four shafts are rotatably journaled within this box and the ends project outside of the walls of the box for driving connection with the parking wheels and the retracting mechanism. Three of these shafts are in a horizontal plane and the fourth is positioned in a plane below and immediately under the center shaft of the three shafts mentioned. A driving connection from the motor transmission 3 is made with the central shaft 50, this driving connection may be a gear train or a driving connection of any other sort such as the flexible shaft 51 shown in Figure 1, or a separate electric motor may be connected to the shaft. A gear 52 is keyed to the shaft 50 and rotated thereby. The gear 52 meshes with a driven gear 53 which is keyed to an elongated bushing 54, the bushing being in turn keyed to a bevel gear 55. The bushing 54 is freely rotatable upon the shaft 56. An idler gear 57 is journaled upon a stud 58 secured to the wall of the box 11 which gear meshes with the beveled gear 55 and with a second beveled gear 59. The gears 55 and 59 mesh on diametrically opposite sides of the idler gear 57. The gear 59 is keyed to a bushing 60 which is freely rotatable upon the shaft 56.

A clutching element 62 is keyed against rotation relatively to the shaft 56 between the faces of the gears 55 and 59 or more accurately the faces of the bushings 54 and 60 but though keyed against rotation the clutching member is slidable axially upon the shaft 56 and carries a clutching tooth 63 adapted to engage the clutching tooth 64 provided on the end of the bushing 54 and on the opposite end of the clutching member 62 is a second clutching tooth 65 adapted to engage the clutching tooth 66 upon the end of the bushing 60. The clutching member carries a groove in its outer circumference within which the clutch shifting fork 67 is inserted. The shaft 56 has also a gear 70 keyed thereto which meshes with an idler gear 71 freely rotatable upon the shaft 50 and held in position by the collar 72 which is pinned or secured in any suitable manner to the shaft 50. Gear 71 in turn meshes with a gear 73 keyed on the shaft 74. The ends of the shafts 56 and 74 are connected respectively to the parking wheels by the drawing shafts 14.

The gear mechanism just described is the driving mechanism for rotating the parking wheels 8 to give the motor vehicle its sidewise propulsion when the parking wheels are swung into contact with the road and the vehicle raised on the parking wheels. As described, the shaft 50 is driven from the motor transmission 3 through the flexible shaft 51. Shaft 50 drives the gear 52 which in turn drives the gear 53 and the gear 55 through the bushing 54. The gear 55 in turn rotates idler gear 57 which rotates the bevel gear 59 so that gears 59 and 55 rotate in opposite directions. For rotation of the parking wheels 8 in one direction the clutching member 62 is slid upon the shaft 56 until the clutching tooth 63 engages and is driven by the clutching tooth 64 at the end of the bushing 54. This makes a direct driving connection between the bushing 54 and shaft 56 through the clutching member 62. To secure reverse rotation of the driving wheels 8 the clutching member 62 is slid in the opposite direction until clutching tooth 65 engages with clutching tooth 66 on the end of the bushing 60. In this driving position the gear 59 drives the shaft 56 through the clutching member 62 and the rotation is in an opposite direction from the rotation produced when the clutching member is in clutching engagement with the bushing 54 inasmuch as gears 55 and 59 rotate in opposite direction.

Rotation of shaft 56 rotates the gear 70 keyed thereto which in turn rotates gear 71 which in turn rotates gear 73 and the shaft 74 to which gear 73 is keyed. It will be seen therefore because of the idler gear 71 that the driving shaft 56 and 74 rotate in the same direction and therefore rotate the parking wheels 8 in the same direction to give the vehicle its sidewise propulsion. The vehicle can be driven sidewise in the opposite direction merely by sliding the clutching member until it engages the gear bushing which is rotating in the opposite direction.

The driving transmission by which the parking arms are swung upward and downward will be described. Referring to Figure 5 the shaft 50 is driven from the motor transmission 3 through the flexible shafting 51 as previously described. The gear 52 is keyed to the shaft 50 and this gear meshes with a gear 77 which is keyed upon an elongated bushing 78. The bushing 78 is freely rotatable upon the shaft 79 and in addition carries the bevel gear 80. The bevel gear 80 meshes with an idler bevel gear 81 freely rotatable upon the stud 82 secured to the wall of the transmission box 13, a third bevel gear 83 meshes with the idler bevel gear and is keyed upon a bushing 84 which bushing is freely rotatable upon the shaft 79. A clutching member 86 for the retracting mechanism is keyed to shaft 79 and slidable axially thereon. The clutching member 86 has a clutching tooth 87 adapted to engage the clutching tooth 88 upon the end of the bushing 78. A second clutching tooth 89 is carried upon the other end of the clutching member and is adapted to engage the clutching tooth 90 on the end of the bushing 84. The clutching member has a groove in its outer circumference in which the clutching fork 91 is inserted. The ends of the shaft 79 are connected to the driving rods 12 which are connected to the swinging mechanism for the retracting arms 9.

It will be noted that the driving mechanism for swinging the retracting arms 9 is the same as the driving mechanism for the driving wheels 8. The gear 52 rotates the gear 77 which in turn rotates bevel gear 80 through the bushing 78. The idler bevel gear 81 is driven from gear 80 and in turn drives the bevel gear 83. The bevel gears 80 and 83 therefore rotate in opposite directions and the shaft 79 may be rotated in one direction by causing the clutching member 86 to engage with the bushing 78 or a reverse rotation of shaft 79 may be secured by sliding the clutching member to engage the bushing 84. Shaft 79 drives the swinging mechanism for the retracting arms 9 by mechanism which has been already described.

The transmission box 13 has a cover plate 94 which makes the transmission mechanism readily accessible. The cover plate has a pair of slots 95 and 96 through which project the control levers 23 and 24. The words "up" and "down" are placed at opposite ends of the slot 96 to indicate the direction in which lever 23 is to be pushed in order to raise or lower the vehicle with the parking wheels. The words "right" and "left" on opposite ends of the slot 95 indicate the direction in which the lever 24 is to be pushed in order to secure right or left hand propulsion of the vehicle.

The levers 23 and 24 are both provided with a locking plunger 100 having a finger ring 101 which is grasped to pull the plunger upward against the tension of the spring 102. These plungers are slidable in a pair of brackets 103 projecting from the levers and their ends project within a hole in a boss 104 adjacent the slots 95 and 96 or holes may be provided in the cover plate itself without the necessity of the raised boss 104. Each plunger locks its respective lever 23 or 24 in central or neutral position. They are readily releasable by lifting up on the finger ring 101 when it is desired to shift the levers to operate the parking device. The lever 23 is pivoted on a stud 105 secured on the boss 106 projected from the wall of the box wall 13. Lever 24 is similarly pivoted upon a stud 107 secured to a boss 108 projecting from the wall of the box 13 opposite from the wall on which the boss 106 projects.

In order to prevent the vehicle from rolling sidewise upon the parking wheels when the clutch is released and shifted to neutral position, a braking mechanism (Figure 5) of any known type is carried on the end of shaft 50. This brake may also be carried on the opposite end of this shaft or may be carried upon either end of the shafts 56 and 74 depending upon its most convenient position. The preferred form of brake is the external contracting band type in which the band 110 circles the brake drum 111 and is gripped thereby. The brake is operated preferably by a foot lever 112 (Figure 2) projecting through the floor board into convenient operating position for the driver.

In this invention the entire driving mechanism being controlled from a central transmission box simplifies the construction of this type of device very materially. Certain modifications of the structure shown and described herein will be apparent to anyone skilled in the art, one of such modifications being the elimination of driving mechanism to one set of parking wheels and relying entirely upon securing the sidewise propulsion of the vehicle through a driving connection to a single front parking wheel and to a single rear parking wheel. Various known forms of transmission and clutching mechanisms may be used in the transmission box in place of that shown herein for instance the faces of the respective driving bevel gears may carry a clutching tooth instead of having such clutching teeth upon separate bushings keyed to the bevel gears. This transmission construction however is the preferred form because of its simplicity.

Another feature is the attaching of the swinging parking wheel mechanism to the axle of the vehicle rather than to the vehicle frame or body so that the wheels and the entire vehicle including the wheels are raised together and does not permit the wheels to drop or sag under their own weight as the frame is lifted by the parking wheels as is the case when the parking mechanism is attached to the frame or body.

What is claimed is:—

1. A vehicle parking device comprising swinging arms attached to the wheel supporting mechanism of the vehicle, retracting mechanism to swing the arms and carried with the arms, a parking wheel mounted upon each arm, a single transmission box, direct driving means to the parking wheels from the transmission box, a single clutch controlling said driving means, driving mechanism for the retracting mechanism at each arm from the transmission box, and a single clutch controlling said driving mechanism from the transmission box.

2. A vehicle parking device comprising swinging retractile arms secured to the vehicle, parking wheels mounted thereon, driven means to swing the arm through a predetermined angle, rotating driving means engaging said driven means and interengaging means on said driven means and said driving means to lock the driven means in predetermined position irrespective of the rotation of the driving means.

3. A vehicle parking device comprising swinging retractile arms secured to the vehicle, parking wheels mounted thereon, a segmental driven gear secured to said arms having a predetermined number of teeth thereon, a segmental driving gear having as many teeth thereon as there are tooth spaces on the driven gear and substantially the balance of its circumference being cylindrical, locking means on either side of the teeth of the driven gear having arcs of the same radius as the cylindrical portion of the driving gear and means to drive the driving gear.

4. A vehicle parking device comprising swinging retractile arms secured to the vehicle, parking wheels mounted thereon, a segmental driven gear secured to said arms having a predetermined number of teeth thereon, a segmental driving gear having as many teeth thereon as there are tooth spaces on the driven gear and substantially the balance of its circumference being cylindrical, locking means on either side of the teeth of the driven gear having arcs of the same radius as the cylindrical portion of the driving gear, a worm and worm gear drive to rotate the driving gear, and means to drive the worm.

5. A vehicle parking device comprising retractile parking wheels, retracting means therefor, a single transmission box centrally positioned upon the vehicle, four shafts journaled within said box having each end protruding therefrom, direct driving connections from the protruding ends of two shafts to the parking wheels, driving connections from the protruding ends of another of said shafts to the retracting means, means connecting the fourth shaft with one of the two shafts connected with the parking wheels and with the shaft connected with the retracting means, and gears connecting the two parking wheel shafts to rotate them in the same direction.

6. A vehicle parking device comprising retractile parking wheels, retracting means therefor, a single transmission box centrally positioned upon the vehicle, three shafts journaled within said box having each end protruding therefrom, direct driving connections from the protruding ends of two shafts to each parking wheel, driving connections from the protruding ends of another of said shafts to the retracting means, and means to drive the shafts.

7. A vehicle parking device comprising retractile parking wheels, retracting means therefor, a single transmission box centrally positioned upon the vehicle, three shafts journaled within said box having each end protruding therefrom, driving connections from the protruding ends of two shafts to the parking wheels, driving connections from the protruding ends of another of said shafts to the retracting means, and means connecting one of the shafts to the vehicle motor.

8. A vehicle parking device comprising swinging arms attached to the wheel supporting mechanism of the vehicle, retracting mechanism for the arms, a parking wheel mounted upon each arm, a single transmission box, direct driving means to the parking wheels from the transmission box, a single clutch controlling said driving means, driving mechanism for the retracting mechanism from the transmission box, a single clutch controlling said driving mechanism from the transmission box, and control handles for each clutch projecting through the floor board of the vehicle within reach of driver of vehicle.

9. A vehicle parking device comprising retractile parking wheels, retracting means therefor, a single transmission box, three shafts journaled in said box in a horizontal plane consisting of a center power shaft and two parking wheel drive shafts a retracting drive shaft journaled beneath the center shaft, the ends of all shafts projecting through the box wall, a driving connection from the vehicle motor to the power shaft, a reversing mechanism connecting the power shaft to one of the parking wheel drive shafts, driving means connecting the parking wheel drive shafts, a reversing mechanism connecting the power shaft with the retracting drive shaft, direct driving connections between the ends of the parking wheel drive shafts and the parking wheels, driving connections from the ends of the retracting drive shaft and the retracting means and control levers for said reversing mechanism.

ALBERT D. MIZZY.
WILLIAM FAVINI.